SUBSCRIPTION-TELEVISION PROGRAM-SCRAMBLING SYSTEM

Filed Nov. 9, 1961

Inventor
GEORGE BROWNSTEIN
by Lyon & Lyon
Attorneys

United States Patent Office 3,202,758 Patented Aug. 24, 1965

3,202,758

SUBSCRIPTION-TELEVISION PROGRAM-SCRAMBLING SYSTEM

George Brownstein, Pacoima, Los Angeles, Calif., assignor to Paramount Pictures Corporation, New York, N.Y., a corporation of New York Filed Nov. 9, 1961, Ser. No. 151,311
4 Claims. (Cl. 178—5.1)

This invention is directed to an arrangement for scrambling subscription-television programs so that an unauthorized receiver will not receive an intelligible television program, and, more particularly, this invention is directed to improvements in a method and means for scrambling subscription-television programs.

In subscription-television systems, the customary procedure is to provide some type of arrangement whereby either a program is completely withheld from the subscriber's receiver or it is rendered unintelligible, unless and until the subscriber has made payment for the program. Many different arrangements for scrambling the program have been suggested, including that of using a spoiling tone. The spoiling tone or spoiling signal is combined with the program signal in such a manner that either the video or the audio signal, or both, are rendered unintelligible.

The problem presented by employing a spoiling tone is that although this is extremely easy to insert and appears easy to remove from the program signal, in practice it is not so easy to remove, and is therefore present in the signal finally viewed by the subscriber. Thus there may still be some minor irritation presented to a subscriber by reason of the residual spoiling tone being present. Also, in the course of removing this spoiling tone, some of the program signals may be altered or removed with it, thus further deteriorating the program signal. Further, if it was desired to render both the program video and the program audio unintelligible to the subscriber receiver, heretofore it was necessary to provide a spoiling signal for both the video and the audio signals. It is also noteworthy that in systems described heretofore, wherein a spoiling signal was employed, no useful function other than that of spoiling the program signals was accomplished by the spoiling signal.

An object of this invention is the provision of a novel scrambling method and means for a subcription-television system.

Another object of this invention is the provision of a scrambling system for a subscription-television system, wherein a single spoiling signal prevents unintelligible reproduction of both the video and audio portions of the program.

Still another object of the present invention is the provision of a scrambling system combining a spoiling with program signals, wherein the spoiling signal is removable without any deleterious effects upon the program signal.

These and other objects of the invention may be achieved in a subscription-television system wherein a transmitter transmits program signals along with a spoiling signal, consisting of a radio frequency carrier which is located at a predetermined fequency below the video program carrier. This spoiling-signal carrier has its frequency chosen to be an odd multiple of half the video line frequency, so that the interleaving principle can be utilized for easier removal of the spoiling signal at the receiver. The frequency of the spoiling signal is also chosen to be substantially close to that of the video-carrier frequency, so that it cannot be turned out by the usual television receiver. As a result, the spoiling signal is presented to the normal video detector in a receiver along with the normal video signal. The spoiling signal beats with the video signal, and this causes objectionable interference in the reproduced picture, obliterating any entertainment value of the television picture.

The audio portion of the subscription-television arrangement is handled as follows. Two channels of audio are transmitted. One of these constitutes the normal program audio, or audio which is associated with the visual portion of the program. This program audio is modulated on a carrier which is 4.5 megacycles above the video carrier at a level of −6 db, with respect to the level of video carrier. A second audio channel known as the barker audio channel, is used for transmitting information indicative of the merits of a program, its price, or other desired information. The barker audio is modulated on a carrier which is at a frequency 4.5 mc. above the frequency of the spoiling-signal carrier. Further, the barker carrier is set at a level of +6 db, with reference to the level of the video program carrier. Therefore, when the unauthorized receiver, which is either that of a nonsubscriber or a subscriber who has not paid for the program, is tuned to receive these signals, the receiver will reproduce the barker audio because the barker carrier beats in the detector with the spoiling signal, which is 4.5 mc. away. The reason the program audio is not heard is because, even though it is 4.5 mc. away from the program carrier, it is −12 db with respect to the barker carrier, and the well-known FM capture effect will cause the subscriber to hear the barker instead of the program carrier.

In order to unscramble the received program, upon payment of the price required for the program, a crystal filter is placed in the circuit so that it shorts out the spoiling tone. As a result, the barker no longer has a frequency against which to beat in order to produce 4.5 megacycles. Therefore, the barker does not appear within the passband of the video detector. Instead, the program audio will come through. Furthermore, since the spoiling tone is removed, the picture will now be intelligible and entertaining.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

Figure 1:
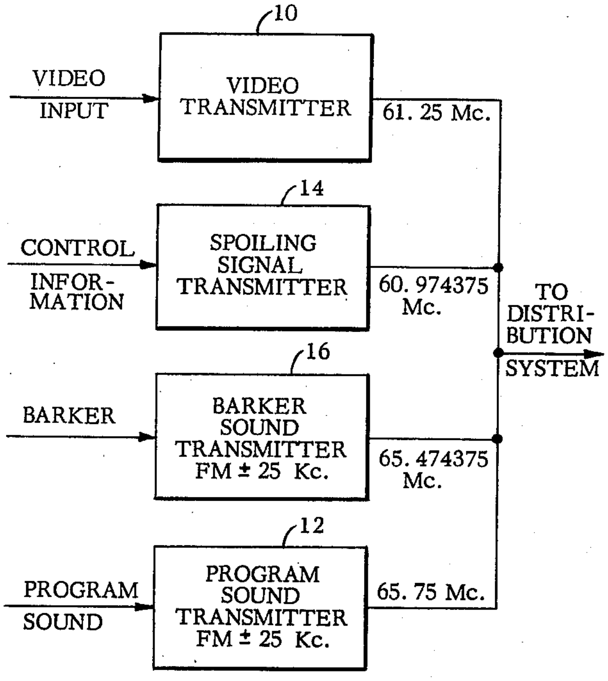
FIGURE 1 is a block diagram of a transmitter in accordance with this invention.

In order to simplify the explanation of this invention, specific numerical examples will be employed. It is to be understood, however, that this is by way of example, and not to be construed as a limitation upon the invention. Thus, by way of example, it will be assumed that Channel 3 of the television channels allotted by the Federal Communication Commission is to be designated as the subscription-television channel. Channel 3 has a video-carrier frequency of 61.25 megacycles. Thus as shown in FIGURE 1, a transmitter includes a video transmitter 10 which has an output consisting of video signals which are modulated on the video carrier of 61.25 megacycles. There is also a program-sound transmitter 12, the output of which comprises program audio which is modulated on the audio carrier of 65.75 megacycles. It will be noted that this program-audio carrier is 4.5 megacycles away from the video carrier. In accordance with this invention, the program-audio carrier is on the order of 6 db lower in amplitude than the video-carrier amplitude.

There is also provided, in accordance with this invention, a spoiling-signal transmitter 14. The frequency of the spoiling signal in accordance with this invention is chosen to be an odd multiple of half the video-signal line frequency, so that the interleaving principle can be taken advantage of for easier removal of the spoiling signal at the receiver. The use of such a frequency gives a 12 db advantage when it is desired to filter out the spoiling signal. Since the spoiling signal occurs in the region where substantially no video sideband energy exists, it can be removed without adversely effecting the video signal. An example of the spoiling-signal frequency chosen for the above example is 275.625 kilocycles below the video carrier, or 60.974375 megacycles. It may be desirable to modulate control information upon the spoiling signal which serves, by way of example, for setting up a coinbox at the receiver for indicating the price which must be paid for viewing the program, and/or for providing information which may be recorded at the receiver after such price has been paid.

An additional audio signal is transmitted which, as previously indicated, is called the barker audio. For this there is provided the transmitter a barker transmitter 16. This constitutes barker audio signals modulated on a carrier, which, in accordance with this invention, is selected to be 4.5 mc. higher than the spoiling-signal frequency. Further, in accordance with this invention, the barker-carrier amplitude is selected to be 6 db greater than the amplitude of the video carrier. Effectively, therefore, the amplitudes of the barker audio carrier and program audio carrier are established such that, when both of these modulated carrier signals are applied to a detector, the FM capture effect is operative and the output of the detector will be the barker audio.

Figure 2:
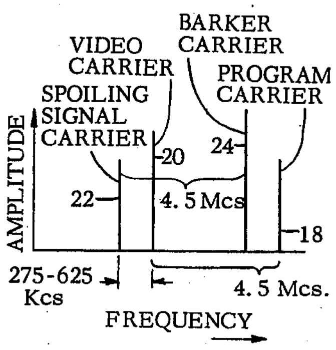
FIGURE 2 is a diagram showing the relative placement and amplitudes of the carrier signals transmitted by the transmitter in accordance with this invention.
Figure 3:
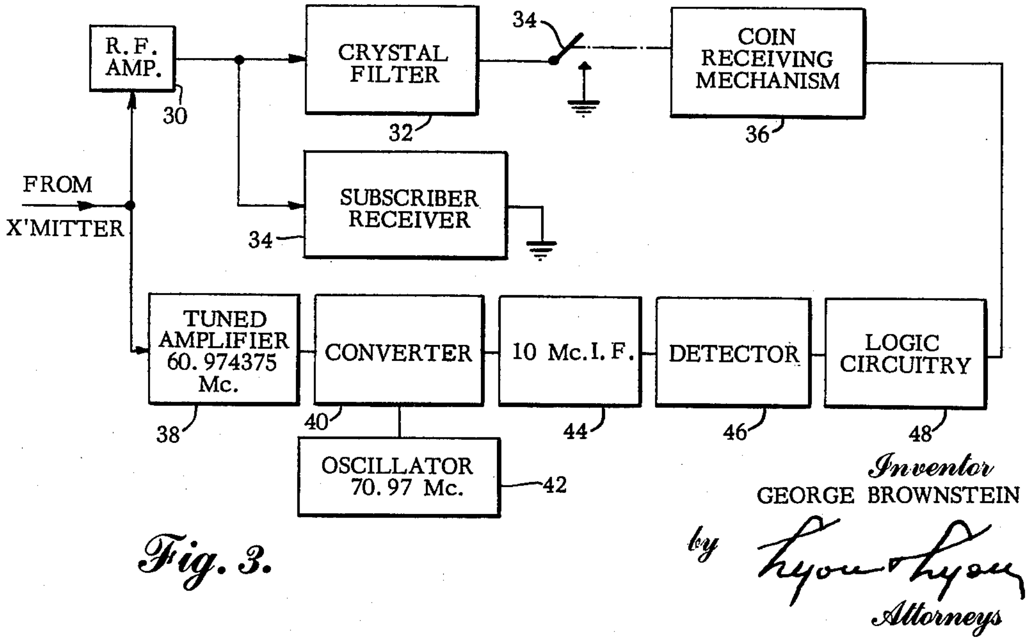
FIGURE 3 is a block diagram of the equipment required at a receiver in accordance with this invention.

To simplify the relative relationships of the carrier frequencies and amplitudes, reference is made to FIGURE 2, which shows these on a frequency-versus-amplitude graph. There it will be seen that the program audio carrier 18 is 4.5 mc. higher in frequency than the video carrier 20 and, further, is at least 6 db lower in amplitude than the video carrier. The spoiling-signal carrier is lower in frequency than the video carrier by 275.625 kc., and the barker carrier 24 is 4.5 mc. higher in frequency than the spoiling signal carrier and, further, is at least 6 db greater in amplitude than the video carrier.

In accordance with this invention, all that is required at a subscriber-receiver location is suitable apparatus for removing the spoiling signal when payment for the subscription-television program has been made. This may comprise a radiofrequency amplifier 30 which is connected to the incoming line from the transmitter, or to an antenna, and which has its output connected to a crystal filter 32 and then to the antenna terminals of a subscriber receiver 34. The crystal filter is connected between the output of the RF amplifier 30 and ground by a suitable switching mechanism 34. This switching mechanism 34 is rendered operative by a coin-receiving mechanism 36. The coin-receiving mechanism may be any one of the known arrangements for closing a switch when it receives a predetermined amount of coinage, which, in the present situation, is determined as the price of the program being transmitted.

As previously pointed out, it may be desirable to modulate control information upon the spoiling signal as a carrier. If this type of operation is desired, then the input signal is applied to a tuned amplifier 38, which is tuned to the frequency of the spoiling signal of 60.974375 megacycles. The output of the tuned amplifier 38 is applied to a converter circuit, where it is heterodyned with the output frequency of an oscillator 42, which oscillates at 70.97 megacycles. The output of the converter at 10 megacycles is applied to a 10-megacycle intermediate-frequency amplifier 44. The output of this IF amplifier is applied to a detector 46, which detects the modulation on the spoiling signal. This modulation is applied to suitable logic circuitry 48, which serves the function of converting the detected modulation into pricing pulses, which are applied to the coin-receiving mechanism, commencing with the first price impulse to avoid erroneous pricing. Apparatus such as the logic circuits and the manner of establishing a price in a coin-receiving mechanism responsive to the demodulated control is described and shown in an application for patent by Patrick R. J. Court, et al., for Receiver Attachment, Serial No. 709,979, filed January 20, 1958, and assigned to a common assignee, now U.S. Patent No. 3,041,389.

The operation of the subscriber receiver 34, which is the usual commercially sold television receiver, prior to the coin-receiving mechanism 36 having the proper amount of coinage deposited therein, is to produce an unintelligible video picture which is accompanied by the barker sound, which can supply information as to the nature of the program, the price of the program, or any other desired information, for which no charge is to be made. The reason this happens is because the barker carrier is 4.5 mc. above the spoiling tone and is at a level of at least 6 db in excess of the video carrier, or 12 db in excess of the program audio carrier. Thus, even though the program audio carrier is also 4.5 mc. above the video carrier in the intercarrier detector of the receiver 34, the barker carrier exceeds the audio carrier by at least 12 db, and thus the frequency-modulation capture effect takes place, as a result of which only barker audio is heard in the output of the receiver. The spoiling tone beats with the video signal in the video detector, and this causes objectionable interference obliterating any entertainment value of the television picture.

Upon payment of the amount which the coin-receiving mechanism 36 indicates should be paid, the switch 34 is closed. This connects the crystal filter 32 across the output of the RF amplifier 30. The crystal filter is tuned to the frequency of the spoiling signal and serves to remove it from the output of the RF amplifier 30. Accordingly, the subscriber receiver will operate in the normal fashion to reproduce the program video and audio. The barker audio is not heard, since the spoiling signal has been removed and there is no signal with which it can heterodyne to provide a 4.5 mc. difference in the detector of the receiver.

There has accordingly been shown and described herein a novel, useful, and simple method and means for transmitting a spoiling signal with a subscription-television program in such a manner that an unauthorized receiver cannot utilize the signals received. Upon payment of a desired or required amount of viewing said program, a very simple arrangement is provided for removing the spoiling tone. In view of the selection of the spoiling-tone frequency, which is at either an even multiple or an odd multiple of one-half the line frequency, filtering out of the spoiling tone may be accomplished without upsetting the video-signal upper sidebands, and the video signal which the receiver displays will not suffer any deterioration. The spoiling signal not only serves independently as a carrier of intelligence, but also serves to provide an arrangement whereby another intelligence carrier may be transmitted, and the intelligence thereon may be heard until such time as the spoiling signal is removed.

I claim:

1. In a subscription-television system of the type wherein it is desired to prevent the intelligible reproduction of a transmitted program by a subscriber's receiver having an intercarrier sound detector until such time as payment of said program has been made, at a transmitter means for generating a video carrier, means for generating a spoiling signal having a frequency selected to be less than that of said video carrier but related thereto in a manner such that when said spoiling signal together with said video carrier are received at receiver antenna terminals the receiver will not intelligibly reproduce said video signals, a first audio signal carrier having a frequency 4.5 megacycles above the frequency of said video carrier, a second audio signal carrier having a frequency 4.5 megacycles above that of said spoiling signal, the amplitude of said first and second audio carriers being selected relative to said video carrier such that when all said carriers are presented to the intercarrier sound detector of a subscriber's receiver said second audio signal carrier will suppress said first audio signal carrier, means for transmitting all said carriers, a receiver having means for receiving all said carriers, an inoperative means for removing said spoiling signal from all said received carriers whereby said subscriber receiver can intelligibly reproduce a program modulated on said video carrier and said first audio signal carrier, and means for rendering said inoperative means operative.

2. In a subscription-television system of the type wherein it is desired to render a program unintelligible to a television receiver until such time as payment for viewing a television program has been made, improvement comprising at a transmitter means for generating a video signal carrier modulated with video program signals, said signals including horizontal-line-frequency signals, means for generating a first audio carrier modulated with first audio signals, said first audio-carrier frequency being displaced from said video-carrier frequency by 4.5 megacycles, said first audio carrier having an amplitude of 6 decibels less than the amplitude of said video carrier, means for generating a spoiling signal having a frequency less than said video-carrier frequency but sufficiently close thereto to pass therewith through the circuits of a commercial television recevier, means for generating a second audio carrier having a frequency 4.5 megacycles higher than the frequency of said spoiling signal, said second audio signal carrier being modulated with second audio signals and having an amplitude 6 decibels greater than the amplitude of said video signal carrier, means for combining and transmitting all said carriers, a receiver having means for receiving all said carriers, an inoperative means for removing said spoiling signal from all said carriers, and means for rendering said inoperative means operative.

3. In a subscription television system as recited in claim 2 wherein the frequency of said spoiling signal is a multiple of one-half the frequency of the horizontal-line-frequency signals in the video signal modulated on said video-program carrier.

4. In a subscription-television system of the type wherein a transmitter includes means for generating program audio signals modulated on a carrier and means for generating video signals including line signals modulated on a carrier, the improvement comprising means for generating spoiling signals having a frequency selected such that when presented to the input of a receiver together with said video signals said receiver will not intelligibly reproduce said video signals, said spoiling-signal frequency further being selected to be an odd multiple of one-half the line-signal frequency, means for generating barker audio signals modulated on a carrier, said barker audio signal carrier having a frequency of 4.5 megacycles above the frequency of said spoiling signals, said means for generating said barker audio signals modulated on a carrier including means for establishing the amplitude of said barker-signal carrier relative to the amplitude of said program-signal carrier at a value such that when all said carriers are applied to a receiver only said barker audio signls are reproduced.

References Cited by the Examiner

UNITED STATES PATENTS

| | | | |
|---|---|---|---|
| 2,847,500 | 8/58 | Druz | 178—5.1 |
| 2,905,747 | 9/59 | Kidd | 178—5.1 |

DAVID G. REDINBAUGH, *Primary Examiner.*

ROY LAKE, *Examiner.*